United States Patent [19]

Van Deventer

[11] Patent Number: 5,459,599
[45] Date of Patent: Oct. 17, 1995

[54] OPTICAL TRANSMISSION SYSTEM HAVING FREQUENCY CONTROL

[75] Inventor: Mattys O. Van Deventer, Leidschendam, Netherlands

[73] Assignee: Koninklijke Ptt Nederland N.V., Al 'S-Gravenhage, Netherlands

[21] Appl. No.: 80,178

[22] Filed: Jun. 18, 1993

[30] Foreign Application Priority Data

Jun. 18, 1992 [NL] Netherlands ............................ 9201077

[51] Int. Cl.$^6$ .................................................. H04B 10/00
[52] U.S. Cl. ........................... 359/152; 359/118; 359/189
[58] Field of Search ..................................... 359/118, 125, 359/137, 152, 143, 164, 162, 189–192, 187, 194, 182

[56] References Cited

U.S. PATENT DOCUMENTS

| | | | |
|---|---|---|---|
| 5,307,197 | 4/1994 | Tanabe et al. ........................... | 359/192 |
| 5,315,425 | 5/1994 | van Deventer et al. ................. | 359/114 |

FOREIGN PATENT DOCUMENTS

| | | |
|---|---|---|
| 0329186A2 | 8/1989 | European Pat. Off. . |
| 0474921A1 | 3/1992 | European Pat. Off. . |
| 0488226A2 | 6/1992 | European Pat. Off. . |
| 8607513 | 12/1986 | WIPO .................................... 359/192 |

OTHER PUBLICATIONS

Polarization-diversity Receiver For Heterodyne/coherent Optical Fiber Communications, T. Okoshi et al, published in IOOC 1983, Fourth Int. Conf. Integrated Opt. Optical Fiber Commun., Tokyo, Japan, Jun. 1983, Paper No. 30C3-2 Tech. Digest, pp. 386–387.
Polarisation–insensitive Coherent Receiver Using A DOuble Balanced Optical Hybrid System, L. D. Tzeng et al, published in Electronics Letters, vol. 23, No. 22, Oct. 22, 1987, pp. 1195–1196.
Measurement of Excess Sensitivity Penalty Of A Four–diode Polarisation Diversity Coherent Receiver, L. D. Tzeng et al, published in Electroncis Letters, vol. 24, No. 6, Mar. 17, 1988, pp. 330–332.
Abstracts of Japanese Patent Application JA–01–177520, Jul., 1989, Polarized Wave Diversity Light Receiver, NEC. Corp. Shibuya et al.
R. Welter et al, "Sixteen–Channel Coherent Broadcast Network AT 155 Mbit/s", Oct. 1989, pp. 1438–1444, Journal of Lightwave Technology, No. 10.

*Primary Examiner*—Leo H. Boudreau
*Assistant Examiner*—Kinfe-Michael Negash
*Attorney, Agent, or Firm*—Frishauf, Holtz, Goodman, Langer & Chick

[57] ABSTRACT

An optical transmission system includes a number of transceivers which are mutually connected by means of a network and are provided with a transmitter, a receiver and a local oscillator. Connected to the local oscillator or a second oscillator is a frequency control device for mutually locking the frequency of the additional signal originating from the second oscillator and the frequency of the output signal of the local oscillator. The receiver is provided with an input for feeding at least a portion of the additional signal. At least one receiver is provided with a first mixing device to which the output signal of the local oscillator and at least a portion of the additional signal are fed. Connected to an input of a mixing and splitting device for obtaining mixed signals having mutually orthogonal polarisations is the output of the first mixing device. The received signal is fed to another input of the mixing and splitting device. The outputs of the mixing and splitting device are connected via mixed-signal branches to balanced detectors, one of the balanced detectors being connected to the input of the frequency control device.

25 Claims, 4 Drawing Sheets

OPTICAL TRANSMISSION SYSTEM HAVING FREQUENCY CONTROL

BACKGROUND OF THE INVENTION

The invention relates to an optical transmission system comprising a number of transceivers which are mutually connected by means of a network and are provided with a transmitter, a receiver and a local oscillator, and also a frequency control device, connected to the local oscillator or a second oscillator, for mutually locking the frequency of the additional signal originating from the second oscillator and the frequency of the output signal of the local oscillator, the receiver being provided with an input for feeding at least a portion of the additional signal. Such a system is disclosed in European Patent Application 0 474 921.

This known optical transmission system comprises a first and second group of transceivers which are mutually coupled by means of a network, in particular a passive optical transmission star.

A complication of the coherent detection used in the known transmission system is the frequency fluctuation of the various lasers, such as the transmission lasers and the local oscillator lasers. In the case of a single coherent link, this problem could readily be eliminated by deriving from the received signal a control signal with which the frequency of the local oscillator is adjusted. This problem is less easy to eliminate in a transmission system having transmitters which are sited at a distance from one another but which have also to be stabilised in frequency.

In the transmission system according to the European Patent Application 0 474 921, an additional signal is used, the frequency of said additional signal and the frequency of the output signal of the local oscillator being mutually locked at a fixed frequency spacing. Used as additional signal is at least a portion of the signal from the transmitter oscillator or transmission laser. In order to obtain the frequency locking mentioned, a control signal has to be derived and fed to a frequency control device which is able to stabilise the frequency of the transmitter.

As a first solution, European Patent Application 0 474 921 proposes feeding a portion of the transmitter signal and a portion of the output signal of the local oscillator to an additional receiver whose output signal controls the frequency control device, which in turn adjusts the frequency of the transmitter.

According to another solution provided in the European Patent Application, the control signal is derived by means of a filter. In this solution, the coherent receiver has to recognise which signal is the incoming signal and which is its own transmitter signal. This makes a "cold start" of the system more complicated.

Summarised briefly, both solutions require additional expensive optical or electrical components for deriving the control signal.

SUMMARY OF THE INVENTION

The object of the invention is to provide a transmission system of the type mentioned in the introduction, in which the abovementioned problems are avoided.

According to the invention, this object is achieved in that at least one receiver is provided with a first mixing device to which the output signal of the local oscillator and at least a portion of the additional signal are fed, a mixing and splitting device for obtaining mixed signals having mutually orthogonal polarisations, of which one input is connected to the output of the first mixing device while the received signal is fed to another input thereof, mixed-signal branches connected to the mixing and splitting device, and balanced detectors connected to the latter, one of the balanced detectors being connected to the input of the frequency control device.

It is pointed out that, from the papers entitled "Polarization-diversity receiver for heterodyne/coherent optical fiber communication" by Okoshi, T., d. Ryu and K. Kikuchi, published in IOOC 1983, Tokyo, 27–30 Jun. 1983, paper 30C3-2, pages 386 and 387, "Polarisation-insensitive coherent receiver using a double balanced optical hybrid system" by Tzeng, L. D., W. L. Emkey, C. A. Burrus, published in Electronics Letters, Volume 23, No. 22, 1987, pages 1195 and 1196 and "Measurement of excess sensitivity penalty of a four-diode polarisation diversity coherent receiver" by Tzeng, L. D., T. W. Cline and A. A. M. Saleh, published in Electronics Letters, Volume 24, No. 6, 1988, pages 330–332, and the abstract of the Japanese Patent Application J-A-01-177520, it is known per se to use a mixing and splitting device to obtain mixed signals having mutually orthogonal polarisations, which mixed signals are fed to balanced detectors. After detection and demodulation, the two signals are added, as a result of which a signal is always received, regardless of the polarisation of the incoming signal.

Surprisingly, it has been found that, in addition to obtaining a reduction in the polarisation sensitivity, a control signal can also readily be derived from the detector signals without the necessity of an additional detector and without the necessity of an additional electrical filter, while the ambiguity in distinguishing the incoming signal and the additional signal is avoided.

DETAILED DESCRIPTION

Figure 1:
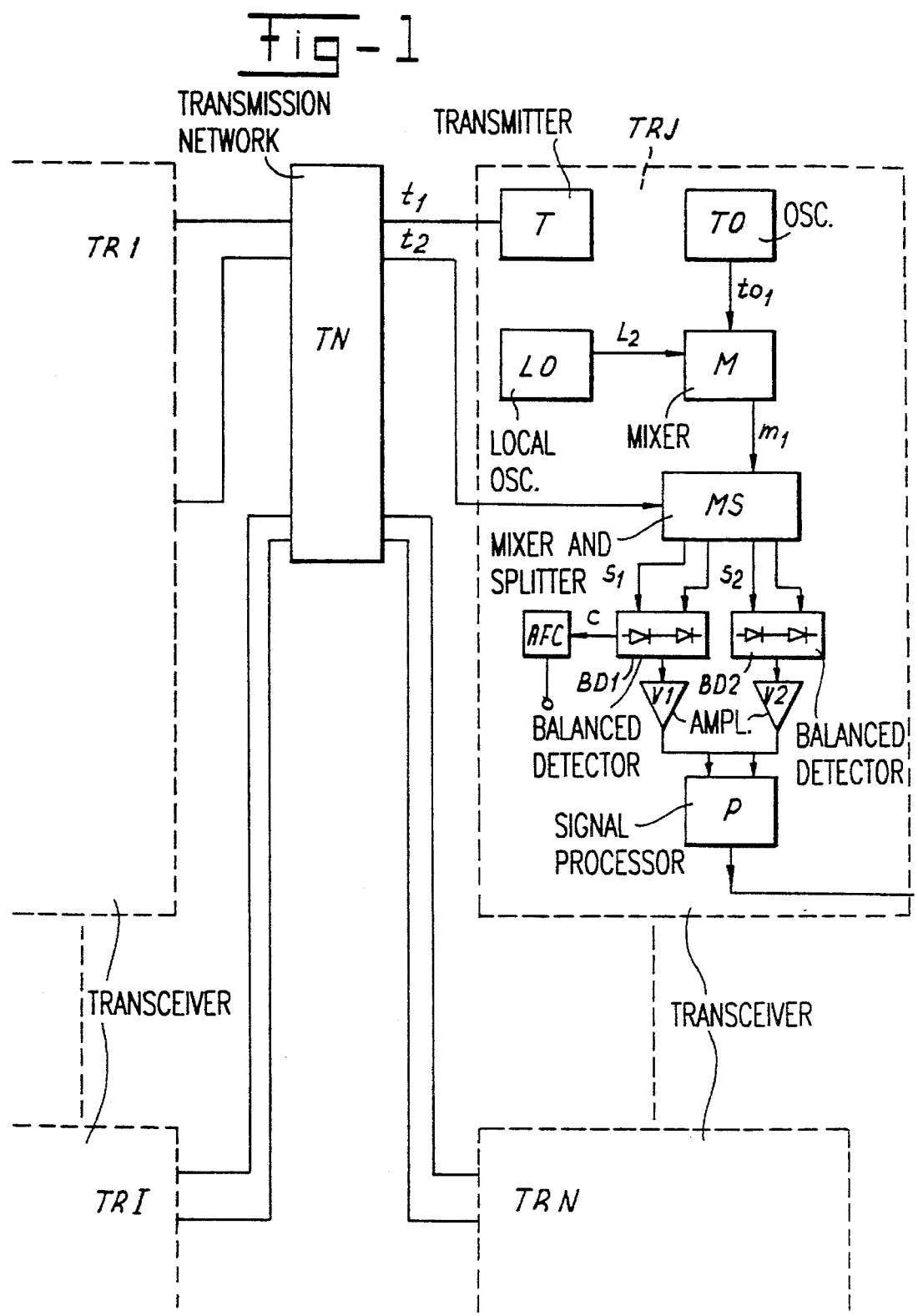
FIG. 1 shows a block diagram of an optical transmission system according to the invention.

In the optical transmission system shown in FIG. 1, a number of transceivers TR1 . . . TRI and TRJ . . . TRN are connected to a transmission network TN via which the transceivers are mutually connected. The transmission network TN may be an optical transmission star or any connection or switching network. The transceivers may comprise the same configuration of devices, so that only the transceiver TRJ is shown in greater detail. The transceiver comprises a transmitter T and a receiving section which are connected to the transmission network TN. If, for example, an optical star is used as transmission network, a received signal $t_2$ comprises the sum of the signals emitted by the transmitters of the other transceivers. The signal to be received and intended for the transceiver TRJ is selected by using the coherent detection principle, for which the local oscillator LO is provided. An output signal $l_2$ from the local oscillator or a portion thereof is fed to a first mixing device M. A signal $to_1$ from a second or additional oscillator TO is also fed to said mixing device M. The signals $l_2$ and $to_1$ fed to the mixing device M are mixed in the mixing device, as a result of which there appears at the output of the mixing device the mixing product signal $m_1$, which is fed to the mixing and splitting device MS. The mixing product signal $m_1$ from the mixing device M and the received signal $t_2$ from the receiver R are mixed in the mixing and splitting device MS and split into two pairs of mixed signals $s_1$ and $s_2$, the polarisation directions of the pairs being mutually orthogonal. These signals, orthogonal in terms of polarisation, are fed to balanced detectors BD1 and BD2. The output signals of the two balanced detectors are fed via amplifiers V1 and V2, respectively, to a signal processing device P, at whose output the selected signal which has to be received by the respective transceiver appears. From one of the balanced detectors, for example BD1, a control signal c is derived which is fed to an automatic frequency control device AFC, at whose output a control signal is generated. Said control signal is fed to the local oscillator LO or to the additional oscillator TO in order to mutually lock them.

It is generally known that polarisation fluctuations arise in the transmission of optical signals. In order to achieve a reception which is insensitive to the polarisation fluctuations, the so-called "polarisation diversity" principle is generally used. It is known to use two coherent receivers to implement this principle, one for the horizontally polarised component of the received signal and one for the vertical component thereof. After detection and demodulation, the best signal can then be selected or the two signals can be added, as a result of which a signal is always received independently of the polarisation of the received signal.

The coherent detection-diversity and polarisation-diversity principles are combined in the receiving section of the transceiver shown in FIG. 1. For this purpose, the mixing and splitting device MS is used. The coherent detection is carried out by means of the local oscillator, the mixing action of the mixing and splitting device MS and the balanced detectors BD1 and BD2 connected thereto and provided with photodetectors. The mixing and splitting device MS provides the pair of output signals $s_1$ having, for example, a horizontal polarisation, while the pair of signals $s_2$ emitted by the device has a vertical polarisation. These signals having mutually orthogonal polarisations are fed to the detectors BD1 and BD2, whose output signals are, after optional amplification, demodulated and added in the processing device P. At the output of the latter the desired signal is then produced and this will always be present despite polarisation fluctuations.

A further complication of coherent detection is the frequency fluctuation of the various oscillators or lasers. In the case of a single coherent link, this problem is readily eliminated by deriving from the received signal a control signal with which the local oscillator frequency is adjusted. It becomes more troublesome in a network in which remote oscillators which have to be stabilised in frequency are used, as in the system shown in FIG. 1.

In the receiver shown in FIG. 1, the control signal is generated by using an additional oscillator TO and a first mixing device M. The mixing product signal $m_1$ at the output of the mixing device M is derived by the latter from the signals fed to said mixing device, the output signals $to_1$ and $l_2$ of the additional oscillator and the local oscillator, respectively. Surprisingly, it has been found that a control signal c for the frequency locking of the local oscillator and the additional oscillator can be derived in each of the balanced detectors BD1 and BD2 by feeding said mixing product signal $m_1$ to the mixing and splitting device MS.

European Patent Application 0 474 921 describes an optical transmission system in which the so-called "tandem frequency control" is used. In this known system, the transmitters of the transceivers are locked to a reference frequency source in an exchange. The transmission signals emitted by these transceivers are fed via a star network to the transceivers of subscriber stations. In the subscriber stations, the received signals are detected by the coherent detection principle, the local oscillator being controlled in such a way that a maximum intermediate frequency signal is produced. Moreover, in this known system, the frequency of the transmitter in the transceiver of the subscriber station is locked by a predetermined frequency spacing with the frequency of the local oscillator. A corresponding locking between the frequency of the transmitter and that of the local oscillator is used in the transceiver in the exchange.

As additional or second oscillator of the transceiver shown in FIG. 1, the transmitter oscillator or transmission laser can be chosen for this tandem-frequency control principle.

For the purpose of tandem-frequency control, a second receiver or filter device is used in the known system to derive the control signal for the automatic frequency control. As a departure from this, an additional receiver or filter circuit becomes superfluous as a result of choosing the receiver as additional oscillator in the transceiver shown in FIG. 1. This advantage is achieved because the output signal of the additional oscillator or transmitter oscillator is first mixed with the output signal of the local oscillator or a portion thereof, after which the mixing product signal is mixed with the output signal of the local oscillator and the received signal, and because balanced detectors are used in which a subtraction operation is performed in order to derive the control signal. In order to use the tandem-frequency control, the output of the automatic frequency control device AFC is connected to the oscillator or laser of the transmitter T.

Figure 2:
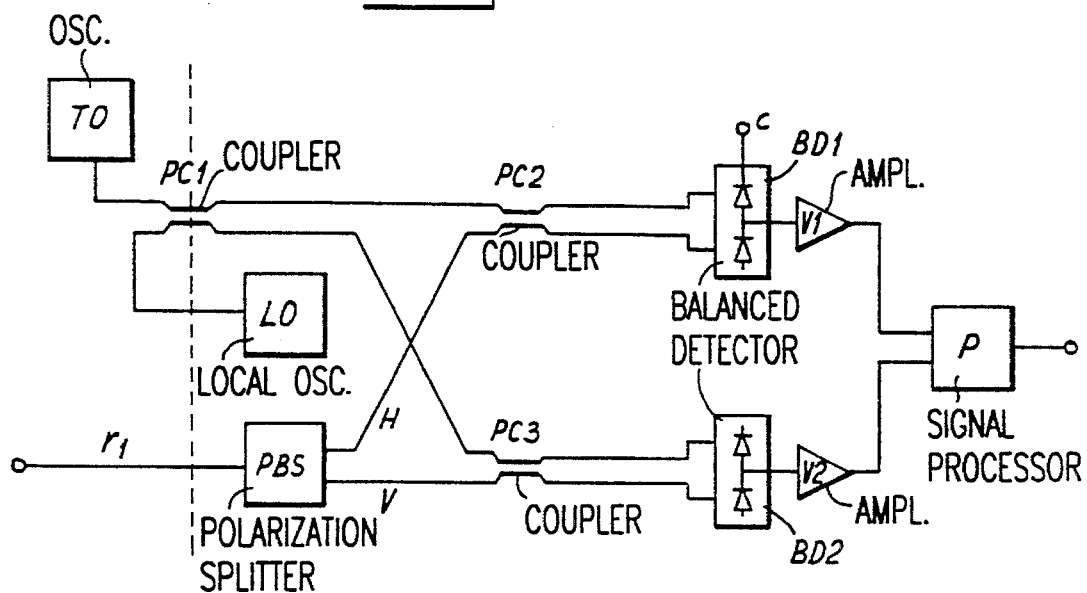
FIG. 2 shows a circuit diagram of an embodiment of a receiver according to the invention.

FIG. 2 shows an embodiment of the receiving section of the transceiver in which the mixing and splitting device of FIG. 1 is shown in greater detail. The received signal $t_2$ is fed to a polarisation splitter PBS1 in order to obtain a horizontal and vertical polarisation component H, V. The horizontal component H is fed to the 3 dB coupling device PC2, while the vertical component V is fed to the 3 dB coupling device PC3. The two outputs of these polarisation coupling devices are each connected to the inputs of the respective balanced detectors BD1 and BD2. The outputs of said balanced detectors BD1 and BD2 are fed via the amplifiers V1 and V2 to the signal processing device P. The remaining inputs of the polarisation coupling devices PC2 and PC3 are connected to the outputs of a 3 dB coupling device PC1. Connected to the inputs of the latter are the local oscillator LO and the additional or second oscillator TO. The mixing products, appearing at the outputs of the 3 dB coupling device PC1, of the local oscillator and additional oscillator are mixed in the 3 dB coupling devices PC2 and PC3 with the horizontal and vertical component, respectively, of the received signal $t_2$. The output signals which are produced by the balanced detectors BD1 and BD2 and which appertain to the horizontal and vertical component, respectively, of the received signal $t_2$ are demodulated and added in the processing device P. There then appears at the output of the processing device P the signal which corresponds to the transmitter signal which has to be detected by this receiver. The control signal c for the automatic frequency control between the additional oscillator TO and the local oscillator LO can then be derived from one of the four photodetectors of the balanced detectors BD1 and BD2.

The polarisation of the two parts of the local oscillator signal which appear at the output of the 3 dB coupling device are adjusted in such a way that an optimum mixing takes place in the 3 dB coupling devices PC2 and PC3.

Preferably, the polarisation of the additional signal from the additional oscillator at the input of the coupling device PC1 is identical to that of the output signal of the local oscillator.

As an alternative, the polarisation splitter PBS may be replaced by a 3 dB coupling device or Y splitter.

Figure 3:
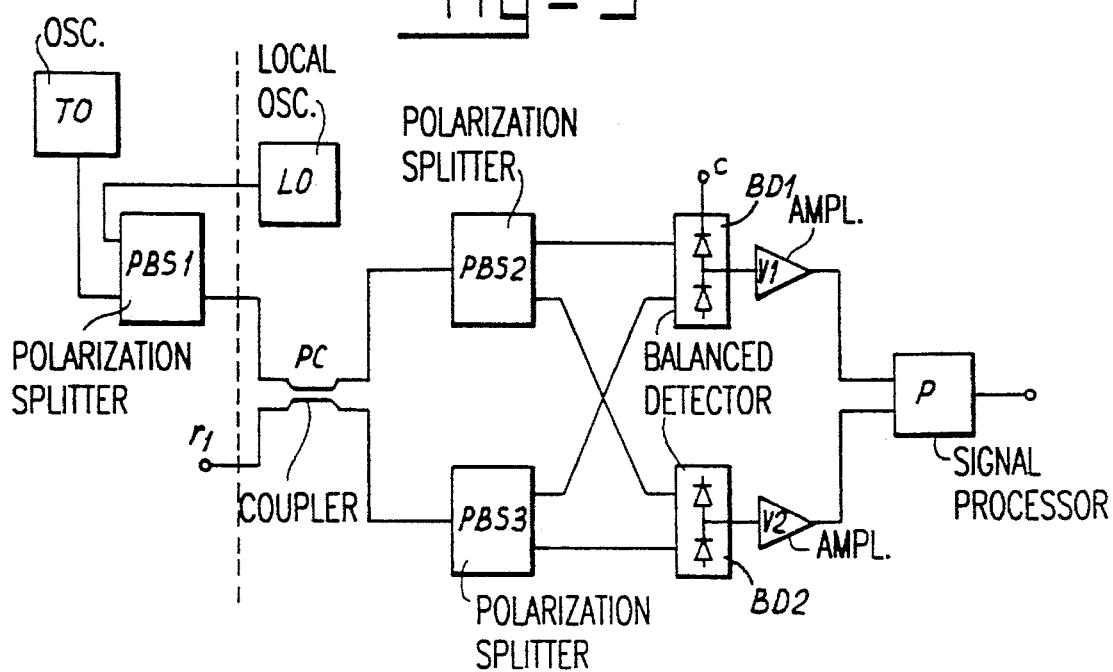
FIG. 3 shows a circuit diagram of another embodiment of a receiver according to the invention.

In the embodiment shown in FIG. 3, the output signals from the local oscillator LO and from the additional oscillator TO are fed to a polarisation splitter PBS1. The output signal of said polarisation splitter PBS1 and the received signal $t_2$ are fed to the inputs of the 3 dB coupling device PC. The two output signals of the 3 dB coupling device PC are both split by means of a polarisation splitter PBS2 and PBS3, respectively, into components having horizontal and vertical polarisation. In adjusting this circuit, it must be ensured that the two splitters have the same orientation and that the local oscillator signal distributes itself equally over the two polarisations. After crosswise interchange of two outputs, the four output signals of the polarisation splitters PBS2 and PBS3 are fed to two balanced detectors BD1 and BD2. After amplification of the output signals of the balanced detectors BD1 and BD2 in the amplifiers V1 and V2 and after processing (demodulation and combination) of the amplified signals in the processing device P, the desired polarisation-insensitive output signal, which corresponds to the signal to be selected by this receiver, is then produced. The control signal c for the frequency control can be tapped off from one of the four photodetectors of the balanced detectors BD1 and BD2, in the version shown the uppermost photodetector of the balanced detector BD1.

Figure 4:
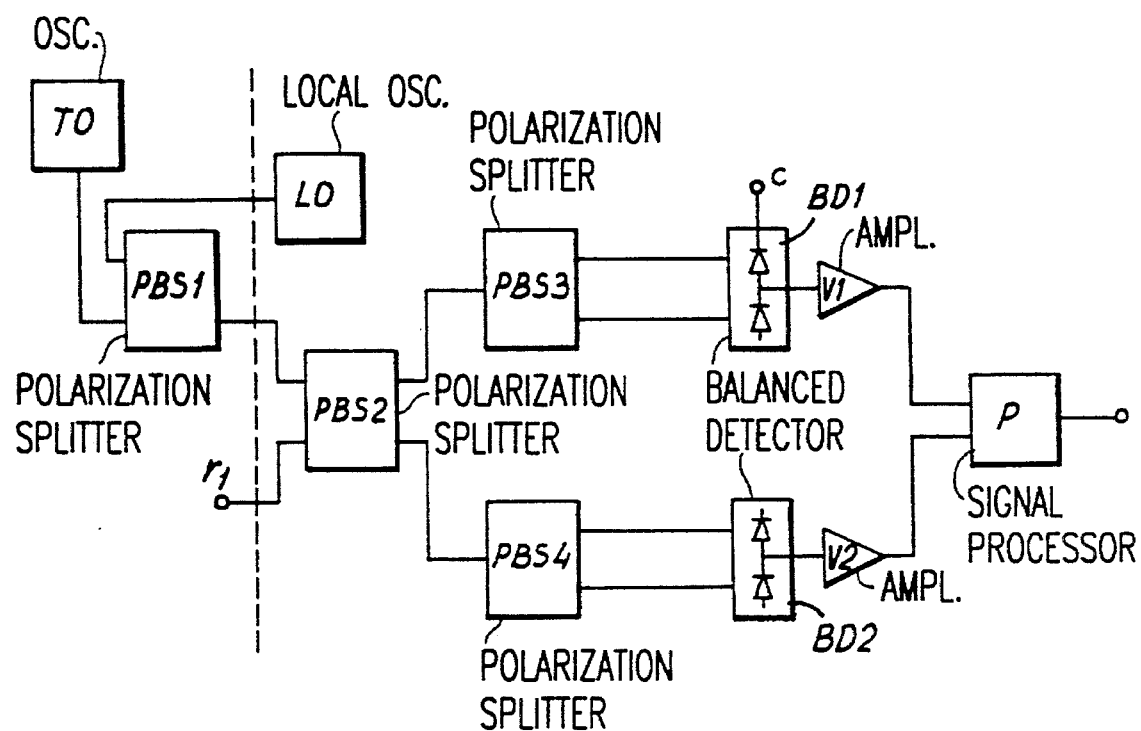
FIG. 4 shows a circuit diagram of yet another embodiment of a receiver according to the invention.

In the embodiment shown in FIG. 4, the 3 dB coupling device PC of FIG. 3 is replaced by a polarisation splitter PBS2. As a result, the crosswise connection of the outputs of the polarisation splitters PBS3 and PBS4 is no longer necessary.

The output signal of the polarisation splitter PBS1, to which the output signals of the local oscillator LO and of the additional oscillator TO are fed, is fed to an input of the polarisation splitter PBS2, while the received signal $t_2$ is fed to the other input. The signals at the two outputs of the polarisation splitter PBS2 are both split by means of a polarisation splitter PBS3 and PBS4, respectively. The polarisation of the two polarisation splitters PBS3 and PBS4 is preferably adjusted at 45° with respect to the polarisation of the polarisation splitter PBS2. The outputs of the polarisation splitter PBS3 are connected to the inputs of the balance detector BD1, while the outputs of the polarisation splitter PBS4 are fed to the inputs of the balanced detector BD2. After amplification of the output signals of the two balanced detectors BD1 and BD2, which have mutually orthogonal polarisation directions, in the amplifiers V1 and V2, respectively, and after processing (demodulation and combination) in the processing device P, the signal to be selected is obtained. The control signal c for the mutual frequency locking of the local oscillator LO and the additional oscillator TO can, as shown, again be taken off from the uppermost photodetector of the balanced-detector BD1.

In the embodiments shown in FIGS. 3 and 4, the polarisations of the local oscillator signal and the signal of the additional oscillator are preferably adjusted in such a way that both pass in an optimum way through the polarisation splitter PBS1. A 3 dB coupling device could also be used optionally instead of a polarisation splitter PBS1. However this produces losses.

The embodiments shown in FIGS. 2, 3 and 4 are optically equivalent. Typical signal strengths are 0 dBm for the local oscillator signal, −40 dBm or less for the received signal and −20 dBm for the additional input signal from the additional oscillator. If the transmission laser is chosen as second oscillator, the strength of the additional oscillator signal or transmitter signal is much less than that of the local oscillator signal because the largest portion of the signal from the transmitter has to be used for the transmission from the transmitter.

As a result of using the abovementioned signal strengths, the additional oscillator signal does not disturb the operation of the balanced polarisation-diversity reception. After all, the mixing product of the additional oscillator signal and the local oscillator signal is suppressed by the balanced detection because said mixing product arrives in phase at the photodetectors of a balanced photodetector pair. The mixing product of the additional oscillator signal and the received signal does not have an interfering effect either, because it is much less (20 dB less) than the mixing product of the local oscillator signal and the received signal.

Figure 5:
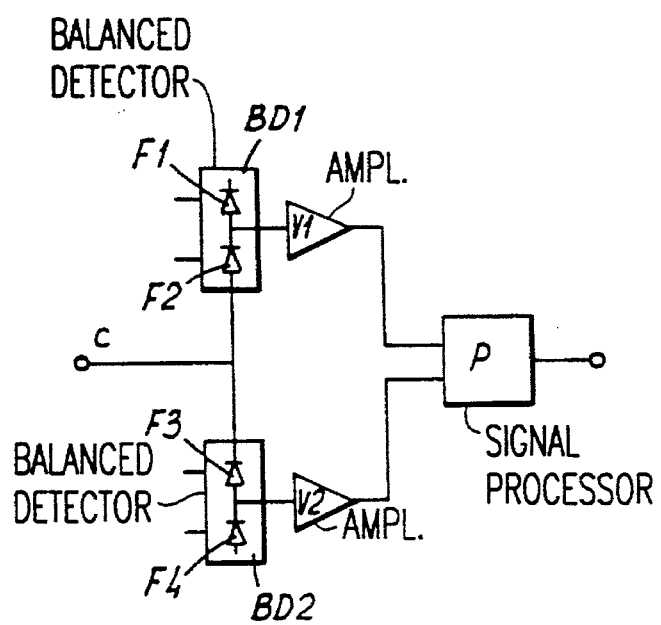
FIG. 5 shows the end section of the receiver shown in FIGS. 1, 2, 3 and 4, a method preferably to be used for tapping off the control signal being indicated.

As is indicated above, the mixing product of the local oscillator signal and the additional oscillator signal can be taken off from any of the balanced detectors. A signal which is twice as strong can be obtained by mutually subtracting the signal of a photodetector of the horizontal polarisation branch and one of the vertical polarisation branch. The control signal to be fed to the frequency control device then corresponds to the difference in the detection signals of the balanced detectors. The implementation of this is shown in FIG. 5. The output signals of the balanced detectors BD1 and BD2 are fed, as already described above, via the amplifiers V1 and V2 to the processing device P. The photodetectors F1, F2, F3 and F4 of the balanced detectors BD1 and BD2 are connected in series and the regulating or control signal c at the connection point of the photodetectors F2 and F3 can be used for the automatic frequency control.

Figure 6:
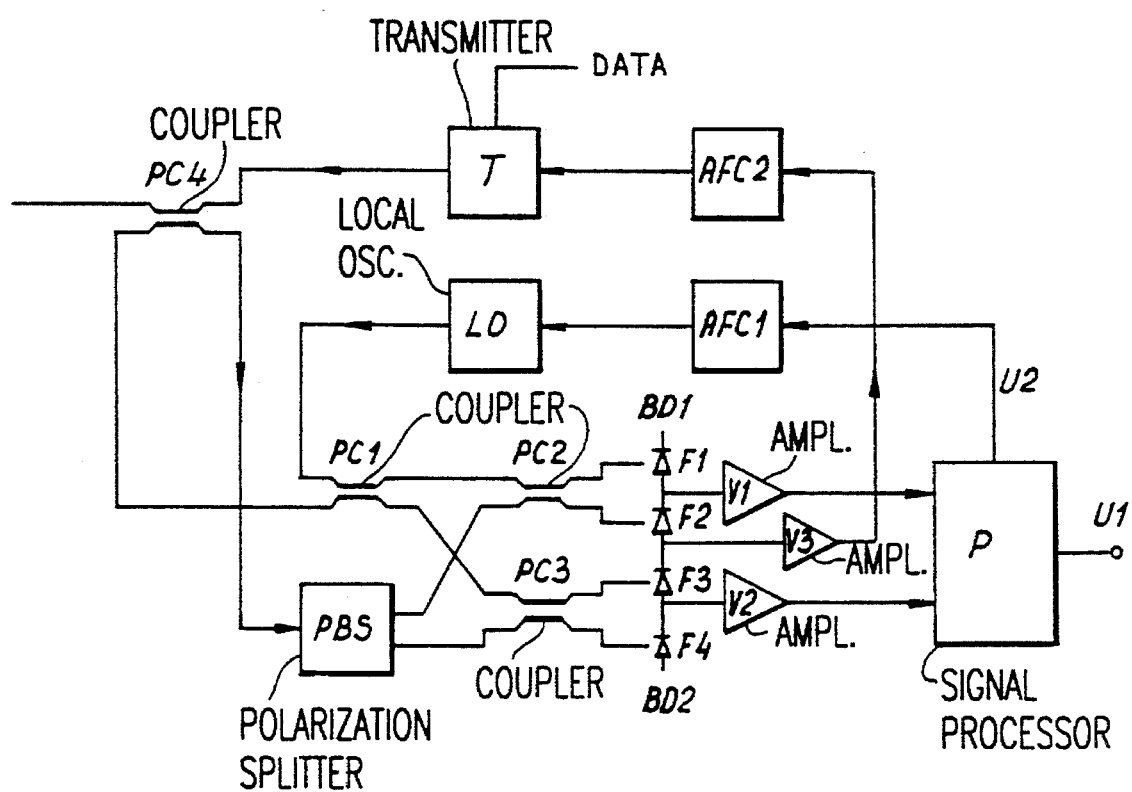
FIG. 6 shows the application of the invention to a bidirectional transmission system.

FIG. 6 shows a transceiver for a bidirectional optical transmission system. In the embodiment shown in FIG. 6, the receiving section according to FIG. 2 has been chosen. It is clear that the embodiments of FIGS. 3 and 4 can be used with the same advantages.

The bidirectional transmission path is connected to an input of the 3 dB coupling device PC4. Connected to the connection on the same side of the coupling device PC4 is an input of a 3 dB coupling device PC1. The output of the transmitter T is connected to a connection the other side of the coupling device PC4, while the connection on the same side of said coupling device is connected to the input of the polarisation splitter PBS. The outputs of the polarisation splitter PBS are connected to the inputs of the 3 dB coupling devices PC2 and PC3. Connected to the other inputs of the coupling devices PC2 and PC3 are the outputs of the 3 dB coupling device PC1. The output of the local oscillator LO is connected to that input of the 3 dB coupling device PC1 which is not connected to the 3 dB coupling device PC4. The outputs of the balanced detectors BD1 and BD2 connected to the 3 dB coupling devices PC2 and PC3 are connected via the amplifiers V1 and V2 to the processing device P. After demodulation and combination in said processing device, a signal corresponding to the signal which is emitted by another transceiver connected via the bidirectional transmission path can be taken off at the output U1 of the processing device. A second output U2 of the processing device P is connected to the local oscillator via an automatic frequency control device AFC1. This frequency control circuit ensures that the intermediate frequency signal appearing at the output U1 of the processing device P is optimum.

The connection point of the photodetectors F2 and F3 of the balanced detectors BD1 and BD2 is connected to the transmitter T via an amplifier V3 and a frequency control device AFC2. This control circuit ensures the locking of the frequency of the transmitter T. As is normal, the transmitter T has a data input DATA.

To lock the transmitter in this bidirectional solution, an additional receiver or filter is also unnecessary for deriving the control signal for the oscillator of the transmitter and the separation of the signal to be received and the control signal for controlling the frequency of the transmission laser is not ambiguous.

I claim:

1. In an optical transmission system comprising a plurality of transceivers which are mutually connected by means of a network, each transceiver comprising:

a transmitter;

a receiver;

a local oscillator;

a second oscillator; and a frequency control device coupled to one of the local oscillator and the second oscillator, for mutually locking a frequency of an additional signal originating from the second oscillator and the frequency of an output signal of the local oscillator;

the receiver having an input for feeding at least a portion of the additional signal;

the improvement wherein at least one receiver of said plurality of transceivers includes:

a first mixing device to which the output signal of the local oscillator and at least a portion of the additional signal are fed;

a mixing and splitting device for obtaining mixed signals having mutually orthogonal polarisations, of which one input is connected to the output of the first mixing device while a received signal is fed to another input thereof;

mixed signal branches connected to the mixing and splitting device; and a plurality of balanced detectors connected to the mixing and splitting device, one of the plurality of balanced detectors being connected to an input of the frequency control device.

2. An optical transmission system according to claim 1, wherein the additional signal has a signal strength which is greater than a strength of the received signal.

3. An optical transmission system according to claim 2, wherein the additional signal has a signal strength which is less than a signal strength of the output signal of the local oscillator.

4. An optical transmission system according to any one of claims 1, 2 or 3, wherein:

the first mixing device comprises a first 3 dB coupling device; and the mixing and splitting device comprises a polarisation splitter and a second and third 3 dB coupling device, the output signal of the local oscillator and the additional signal being fed to inputs of the first 3 dB coupling device which has outputs connected to first inputs of the second and third 3 dB coupling devices, the third 3 dB coupling device having outputs which are connected to the respective balanced detectors and having second inputs which are connected to outputs of the polarisation splitter to whose input the received signal is fed.

5. An optical transmission system according to claim 4, wherein the polarisation of the additional signal at the input of the first coupling device is essentially identical to that of the output signal of the local oscillator.

6. An optical transmission system according to any one of claims 1, 2 or 3, wherein the first mixing device comprises a first 3 dB coupling device.

7. An optical transmission system according to claim 1, wherein the first mixing device comprises a first polarisation splitter.

8. An optical transmission system according to claim 6, wherein an output of one of the first coupling device and the polarisation splitter is connected to a first input of a second 3 dB coupling device, to the second input of which the received signal is fed and outputs of which are connected to a second and third polarisation splitter, respectively, whose outputs are each coupled, with a corresponding polarisation direction, to the balanced detectors.

9. An optical transmission system according to claim 6, wherein an output of one of the first coupling device and the polarisation splitter is connected to a first input of a second polarisation splitter to whose second input the received signal is fed and whose outputs are connected to a third and fourth polarisation splitter, respectively, each coupled to a balanced detector.

10. An optical transmission system according to claim 9, wherein the polarisation of the third and fourth polarisation splitters is adjusted at 45° with respect to the polarisation of the second polarisation splitter.

11. An Optical transmission system according to claim 8, wherein the polarisations of the output signal of the local oscillator and of the additional signal are adjusted such that both appear in an optimum form at the output of one of the first coupling device and the polarisation splitter.

12. An optical transmission system according to any one of claims 1, 2 or 3, wherein balanced detectors comprise photodetectors which are connected in series, and wherein a control signal is taken off from a connection point of two centermost photodetectors.

13. An optical transmission system according to any one of claims 1, 2 or 3, in which the receiver is connected to a bidirectional transmission path, and wherein a 3 dB coupling device is provided, said 3 dB coupling device having one side coupled to the transmission path and that input or the first mixing device which is not connected to the output of the local oscillator.

14. An optical receiver for use in an optical transmission system comprising a number of transceivers which are mutually connected by means of a network, said optical receiver comprising:

a local oscillator;

a second oscillator;

a frequency control device coupled to one of the local oscillator and the second oscillator, for mutually locking a frequency of an additional signal originating from said second oscillator and the frequency of an output signal of the local oscillator;

the receiver having an input for feeding at least a portion of the additional signal;

a first mixing device to which the output signal of the local oscillator and at least a portion of the additional signal are fed;

a mixing and splitting device for obtaining mixed signals having mutually orthogonal polarisations, of which one input is connected to the output of the first mixing device while a received signal is fed to another input thereof;

mixed signal branches connected to the mixing and splitting device; and a balanced detector connected to an input of the frequency control device.

15. An optical receiver according to claim 14, wherein the additional signal has a signal strength which is greater than a strength of the received signal.

16. An optical receiver according to claim 15 wherein the additional signal has a signal strength which is less than a signal strength of the output signal of the local oscillator.

17. An optical receiver according to claim 14, wherein;

said first mixing device comprises a 3 dB coupling device; and the mixing and splitting device comprises a polarisation splitter and a second and third 3 dB coupling device, the output signal of the local oscillator and the additional signal being fed to inputs of the first 3 dB coupling device which has outputs connected to first inputs of the second and third 3 dB coupling devices, the third 3 dB coupling device having outputs which are connected to respective balanced detectors and having second inputs which are connected to outputs of the polarisation splitter to whose input the received signal is fed.

18. An optical receiver according to claim 14, wherein the polarisation of the additional signal at the input of the first coupling device is essentially identical to that of the output signal of the local oscillator.

19. An optical receiver according to claim 14, wherein the first mixing device comprises by a first 3 dB coupling device.

20. An optical receiver according to claim 14, wherein the first mixing device comprises by a first polarisation splitter.

21. An optical receiver according to claim 19 or 20, wherein an output of one Of the first coupling device and the polarisation splitter is connected to a first input of a second 3 dB coupling device, to the second input of which the received signal is fed and outputs of which are connected to a second and third polarisation splitter, respectively, whose outputs are each coupled, with a corresponding polarisation direction, to the balanced detector.

22. An optical receiver according to claim 21, wherein the polarisations of the output signal of the local oscillator and of the additional signal are adjusted such that both appear in an optimum form at the output of one of the first coupling device and the polarisation splitter.

23. An optical receiver according to claim 19 or 20, wherein an output of one of the first coupling device and the polarisation splitter is connected to a first input of a second polarisation splitter to whose second input the received signal is fed and whose outputs are connected to a third and fourth polarisation splitter, respectively, each coupled to a balanced detector.

24. An optical receiver according to claim 23, wherein the polarisation of the third and fourth polarisation splitters is adjusted at 45° with respect to the polarisation of the second polarisation splitter.

25. An optical receiver according to claim 14, wherein said balance detectors comprise photodetectors which are connected in series, and wherein a control signal is taken off from a connection point of two centermost photodetectors.

* * * * *